(Model.)

H. CASE.
PRUNING IMPLEMENT.

No. 304,293. Patented Sept. 2, 1884.

WITNESSES:
C. Neveux
C. Sedgwick

INVENTOR:
H. Case
BY Munn & Co
ATTORNEYS.

ered portion of the bark on the tree in

UNITED STATES PATENT OFFICE.

HORACE CASE, OF FREEPORT, MICHIGAN.

PRUNING IMPLEMENT.

SPECIFICATION forming part of Letters Patent No. 304,293, dated September 2, 1884.

Application filed July 6, 1883. (Model.)

*To all whom it may concern:*

Be it known that I, HORACE CASE, of Freeport, in the county of Barry and State of Michigan, have invented certain new and useful Improvements in Pruning-Shears, of which the following is a full, clear, and exact description.

This invention consists in pruning-shears of novel construction, capable of being worked in opposite directions to sever a bough or twig from a tree without injury to the bark remaining on the tree, and that may be used as a chisel for cutting off small sprouts in the right direction, thus making the instrument an exceedingly useful one for nurserymen, fruit-growers, and others.

Reference is to be had to the accompanying drawings, forming a part of this specification, in which similar letters of reference indicate corresponding parts in all the figures.

Figure 1:
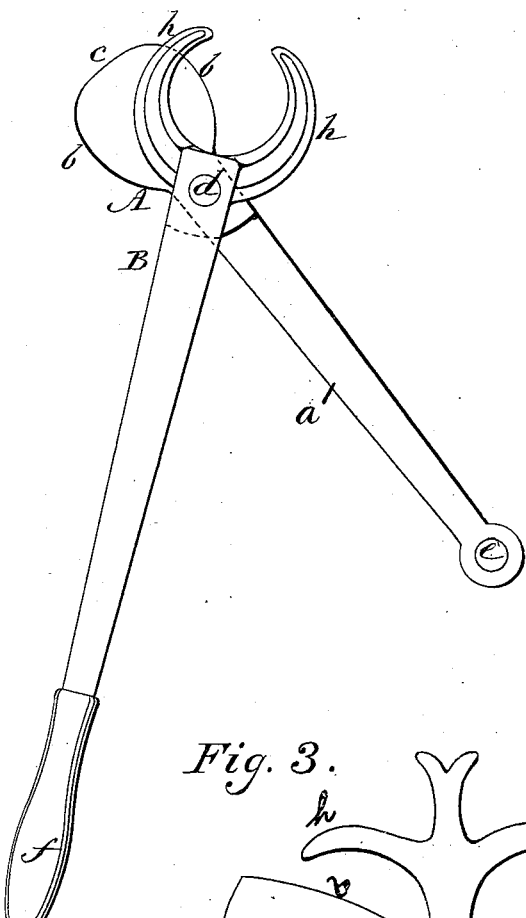
Figure 2:
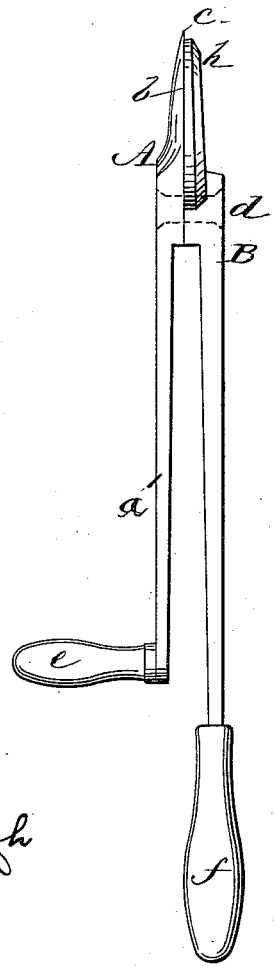

Figure 1 is a top view of the shears when held to cut horizontally, the same being represented in an open condition. Fig. 2 is a side or edge of the same closed, and Fig. 3 is a modification of the form of the jaws or hooks.

A in the drawings indicates the cutting-blade of the shears, of spread construction or plate or disk like shape at its cutting end, which is flat on the top, (supposing the instrument to be held horizontally,) and has opposite cutting-edges *b b*, and a forward chisel cutting-edge, *c*, said edges being sharpened from beneath or back side of the blade, that is pivoted immediately in rear of its cutting end, as at *d*, to the stationary arm or blade B, and is extended sufficiently back to give it the necessary leverage; also is provided with a handle, *e*, for working it. The stationary arm or blade B, which may be extended farther in the rear toward its handle end *f*, to give the necessary purchase or hold, is made of a jaw or reverse hook shape on opposite sides at its forward end. These hooks *h h* are flat on their backs or under side, beneath or against which the flat cutting end of the blade A works, and are or may be beveled off on their opposite sides toward their concave edges.

In using the shears the instrument should be held so that the cutting blade or bar A will always be on the under or inner side of the shears, whereby the bruising of the bark of the tree will be confined to the severed bough that falls to the ground, leaving the remaining severed portion of the bark on the tree in a healthy condition. This is important, and is fully obtained by my improved shears.

Figure 3:
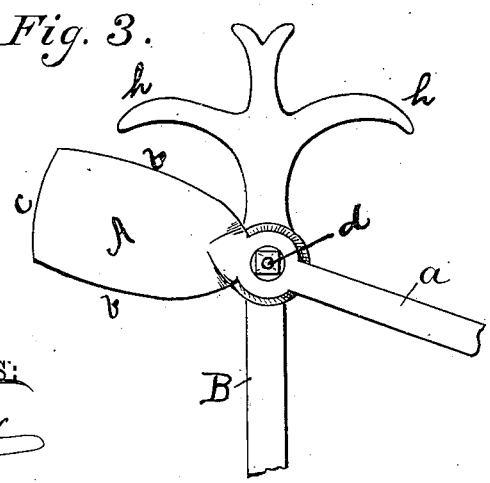

In the modification shown in Fig. 3 the hooks *h h* are bent outwardly, and they may be used to draw the bough or branch down to within convenient cutting distance, which cannot be done by the form of shears shown in the patent of Samson and Dill, of October 1, 1882.

Another conspicuous feature of the invention is that the cutting-blade A of the shears may be worked either to the right or to the left, across or under the blade B, that receives the bough to be severed within its hooks *h h*, either side edge, *b b*, being a cutting one. Furthermore, the instrument may be used as a knife by its forward chisel cutting-edge *c*, to cut small sprouts in any required and proper direction.

Thus my improved shears has conveniences and advantages which ordinary pruning-shears do not possess.

I do not abandon or dedicate to the public any patentable features set forth herein and not hereinafter claimed; but reserve the right to claim the same either in a reissue of any patent that may be granted upon this application or in other applications for Letters Patent that I may make.

Having thus fully described my invention, I claim as new and desire to secure by Letters Patent—

The double cutting-blades A B, hinged together by the rivet *d*, and adapted to cut in either direction, and provided with the handles *e f*, and having the shorter handle *e* laterally bent at a right angle to the longer handle *f*, substantially as described.

HORACE CASE.

Witnesses:
 MICHAEL S. ROUSH,
 JAMES W. GODFREY.